Figure 7:
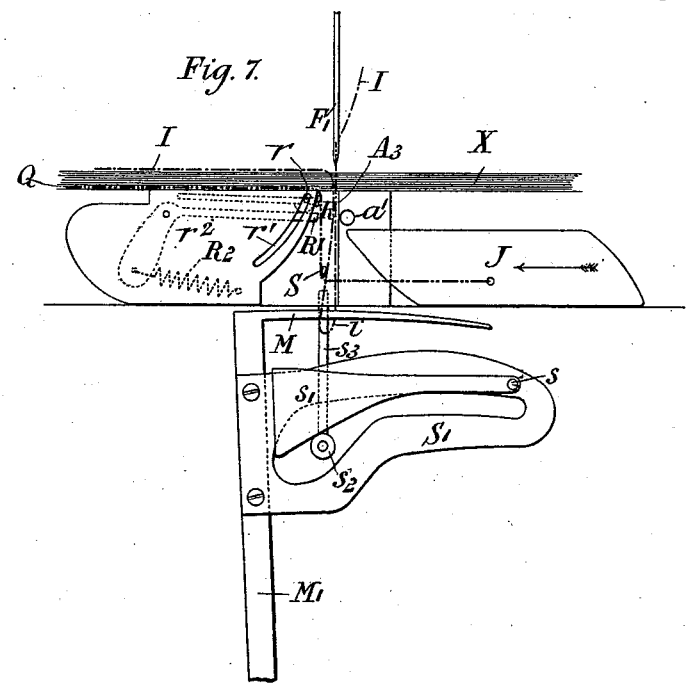

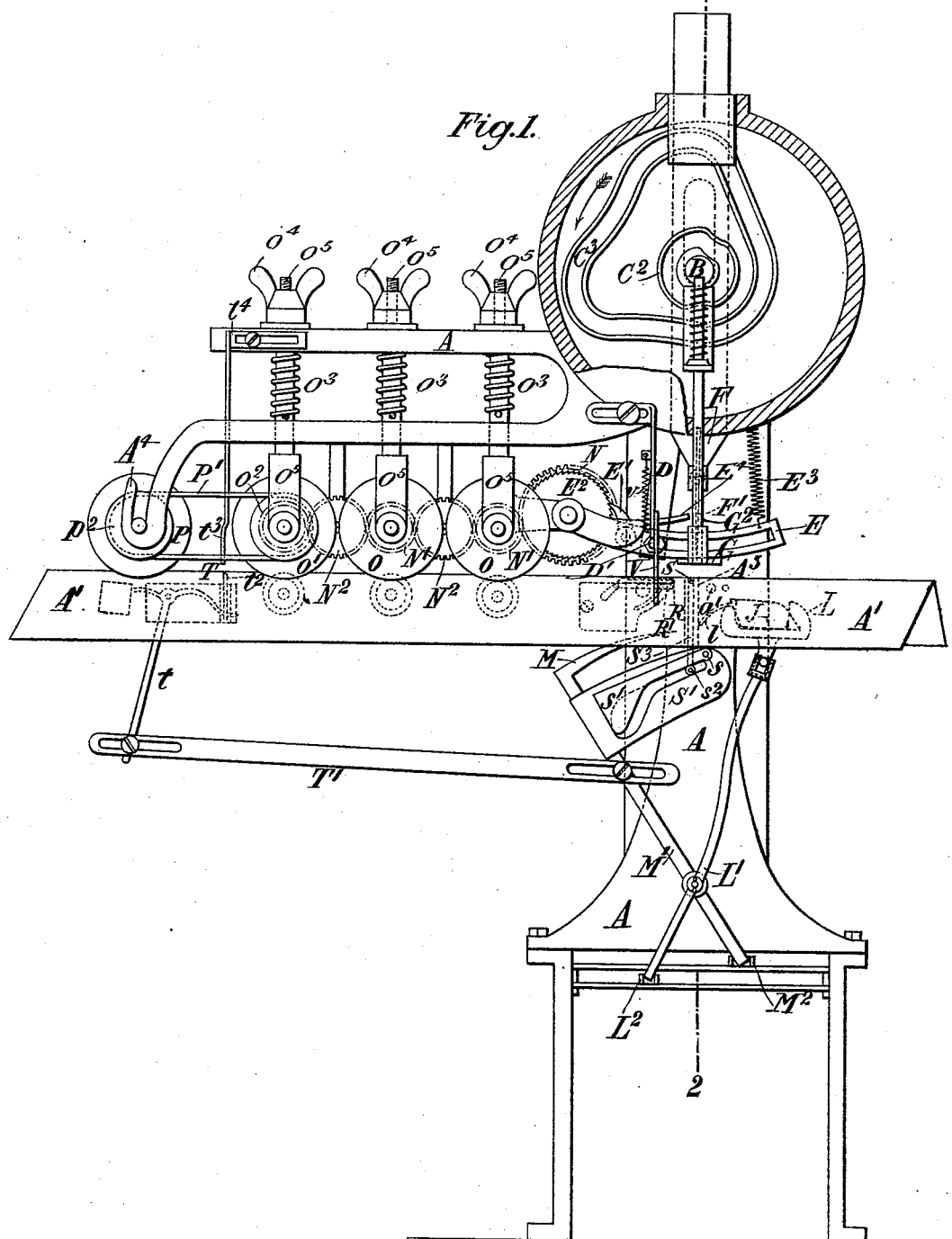

(No Model.) 10 Sheets—Sheet 2.
G. KLEIM & C. FORWERK.
MACHINE FOR STITCHING PAMPHLETS, &c.
No. 538,733. Patented May 7, 1895.
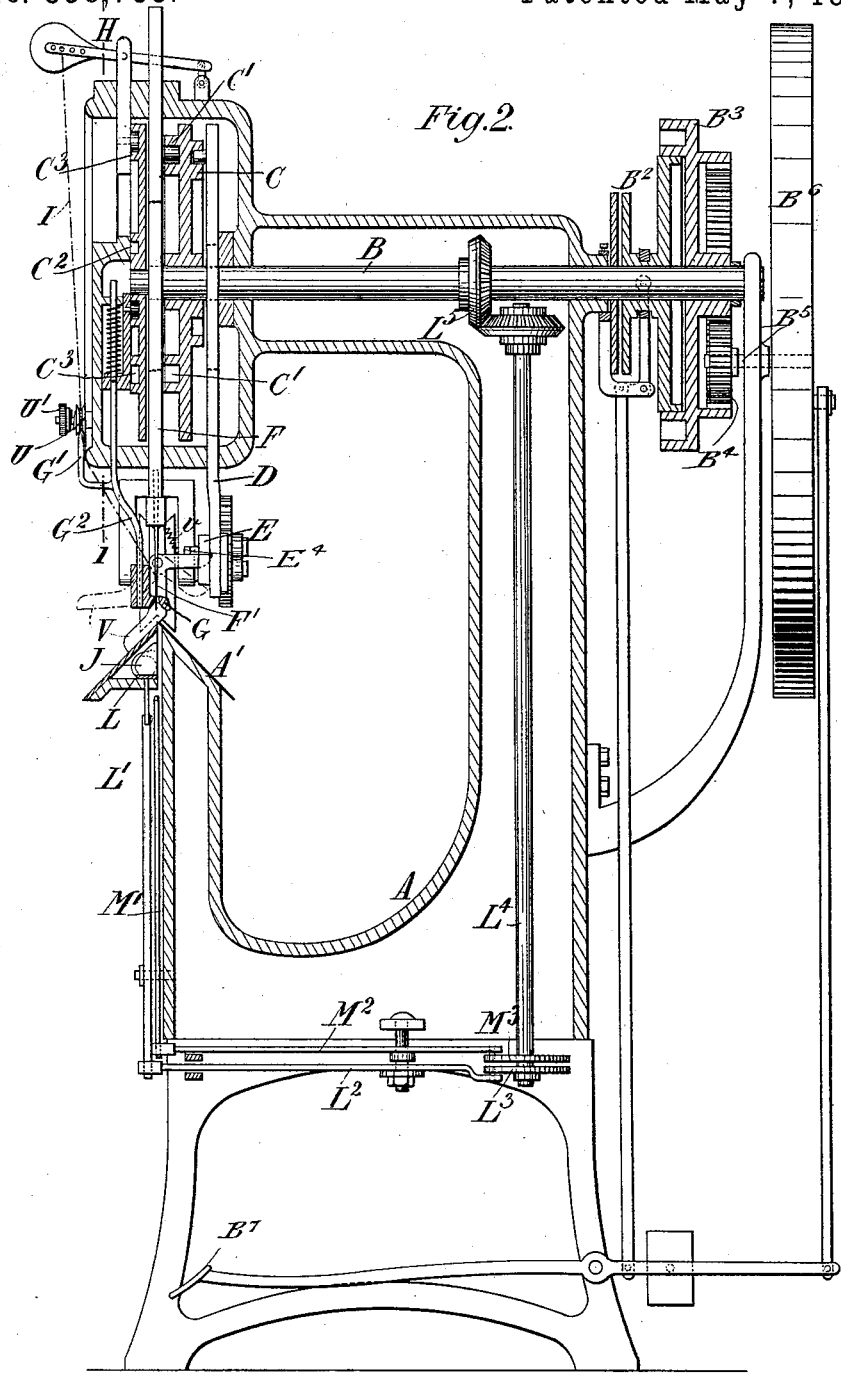
WITNESSES:
Thomas M. Smith
Emile E. Berthoud
INVENTORS,
Gustav Kleim
Carl Forwerk
By J. Walter Douglass
ATT'Y.

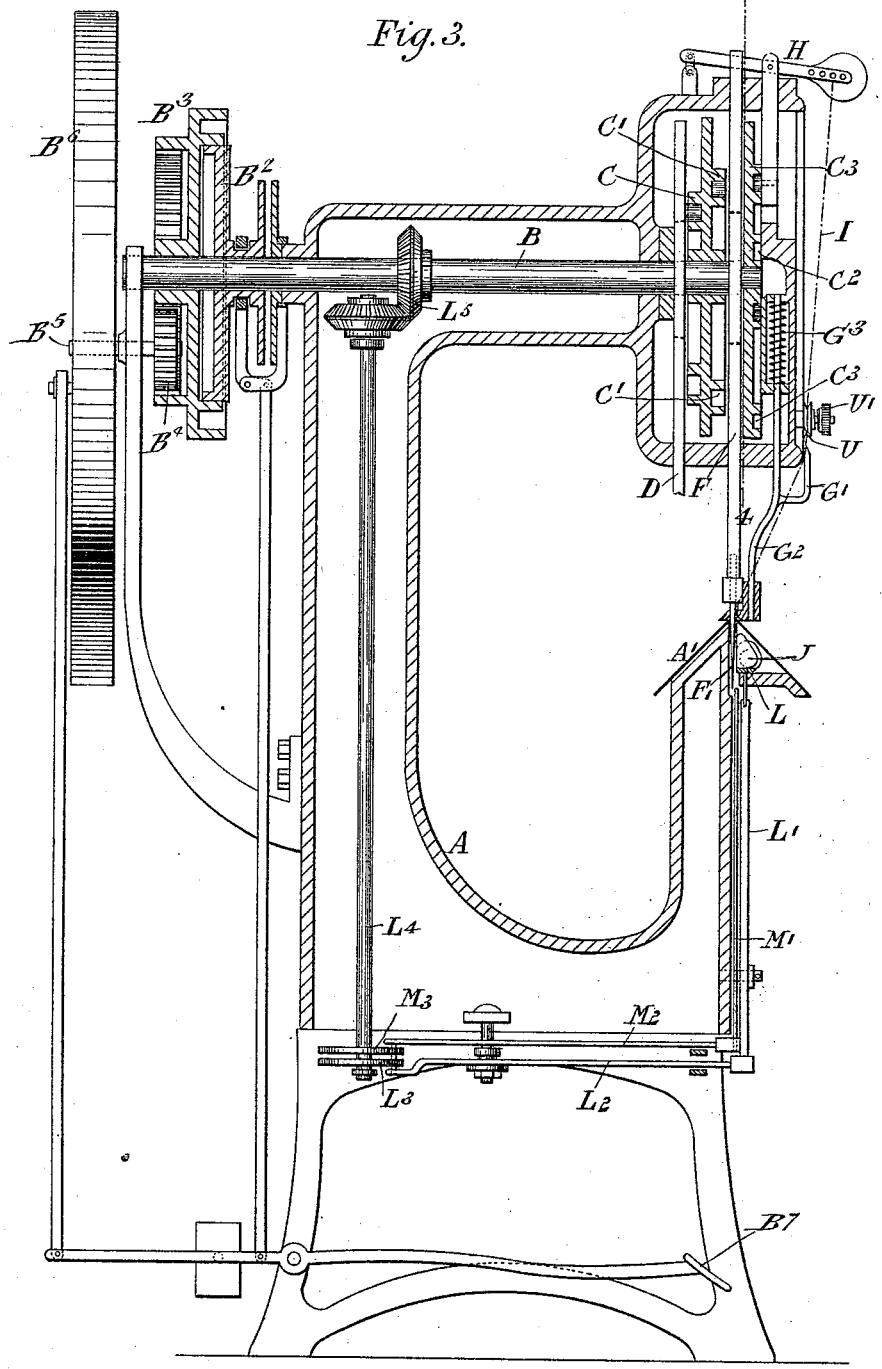

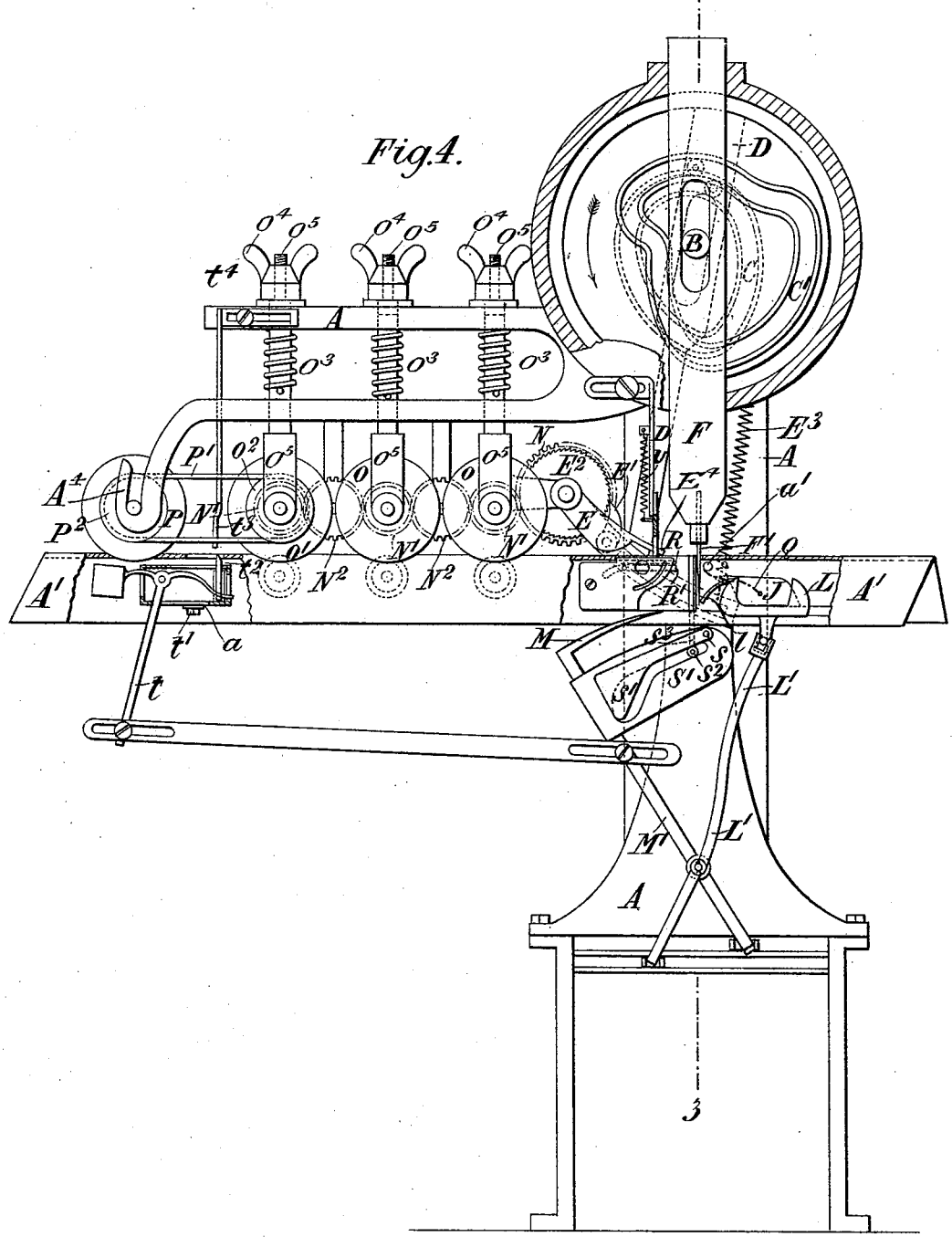

(No Model.) 10 Sheets—Sheet 5.
G. KLEIM & C. FORWERK.
MACHINE FOR STITCHING PAMPHLETS, &c.
No. 538,733. Patented May 7, 1895.
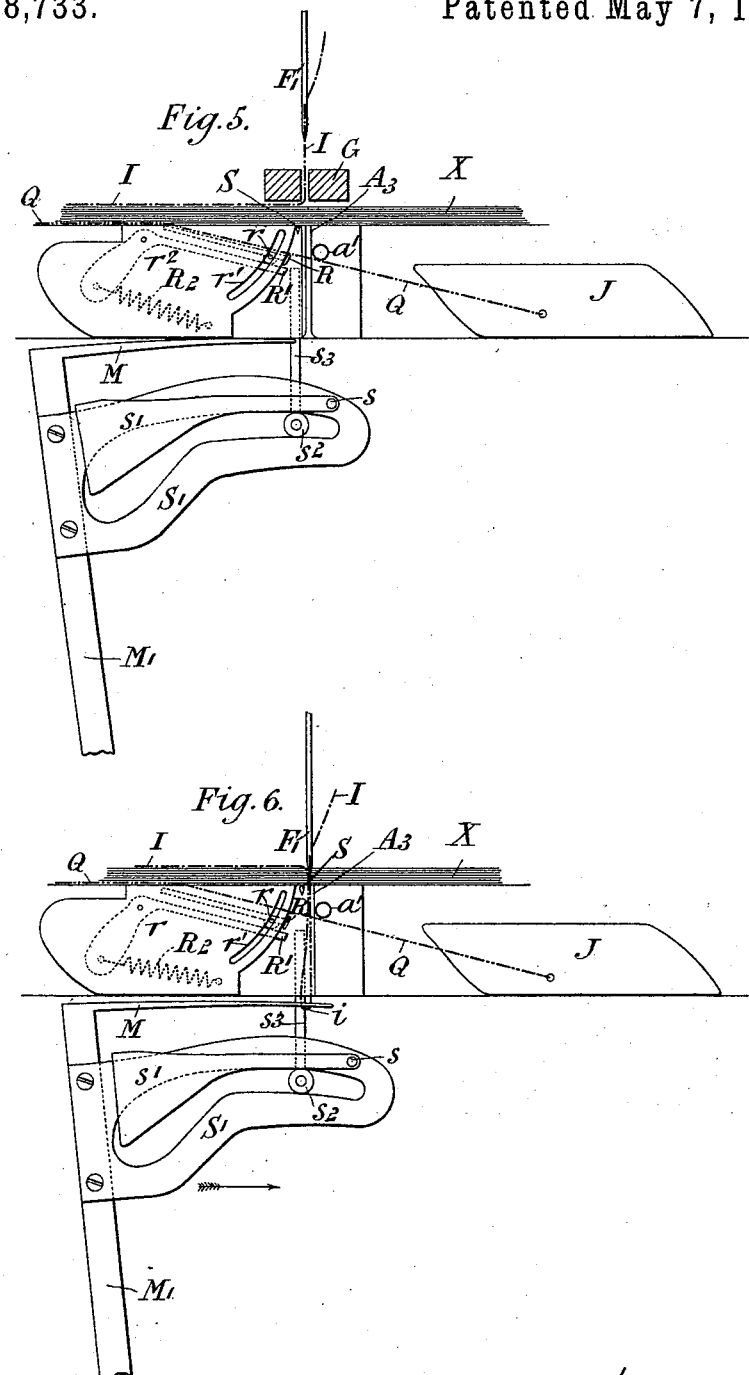
WITNESSES:
Thomas M. Smith.
Emile E. Berthoud.
INVENTORS,
Gustav Kleim and Carl Forwerk,
By J. Walter Douglass.
ATT'Y.

(No Model.) 10 Sheets—Sheet 6.

G. KLEIM & C. FORWERK.
MACHINE FOR STITCHING PAMPHLETS, &c.

No. 538,733. Patented May 7, 1895.

WITNESSES:
Thomas M. Smith.
Emile E. Berthoud.

INVENTORS.
Gustav Kleim & Carl Forwerk
By J. Walter Douglass.
ATT'Y.

(No Model.) 10 Sheets—Sheet 7.
G. KLEIM & C. FORWERK.
MACHINE FOR STITCHING PAMPHLETS, &c.
No. 538,733. Patented May 7, 1895.
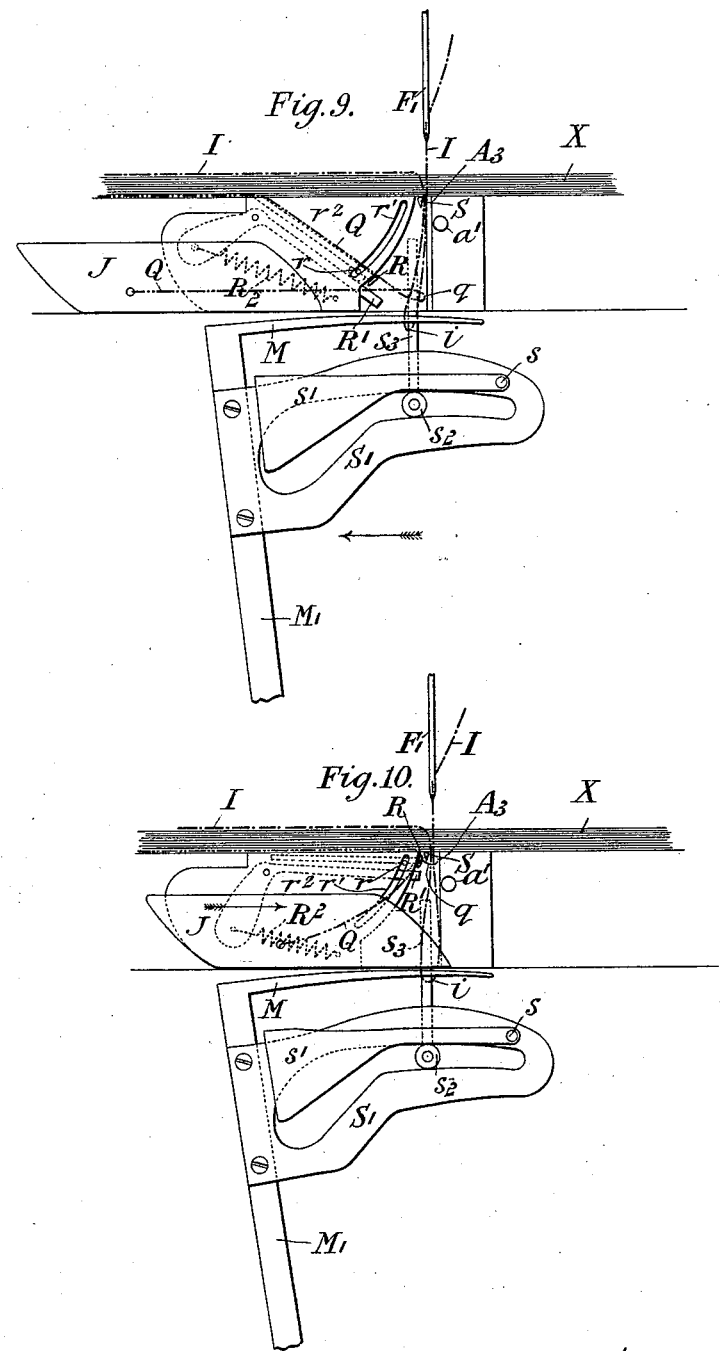
WITNESSES:
Thomas M. Smith.
Emile E. Berthoud.
INVENTORS,
Gustav Kleim and Carl Forwerk,
By J. Walter Douglass.
ATT'Y.

(No Model.) 10 Sheets—Sheet 8.
G. KLEIM & C. FORWERK.
MACHINE FOR STITCHING PAMPHLETS, &c.
No. 538,733. Patented May 7, 1895.
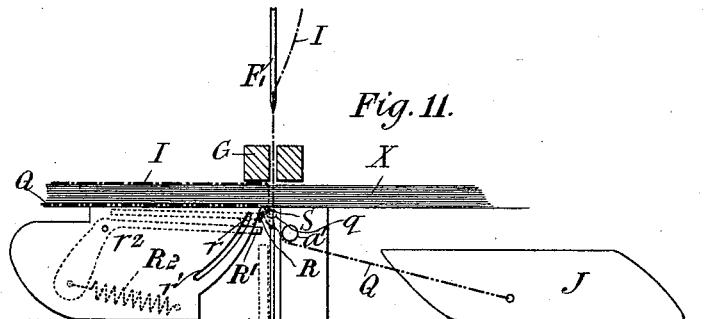
*Fig. 11.*
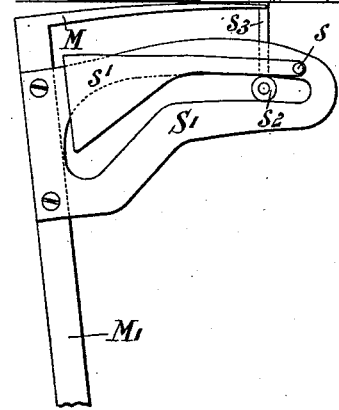
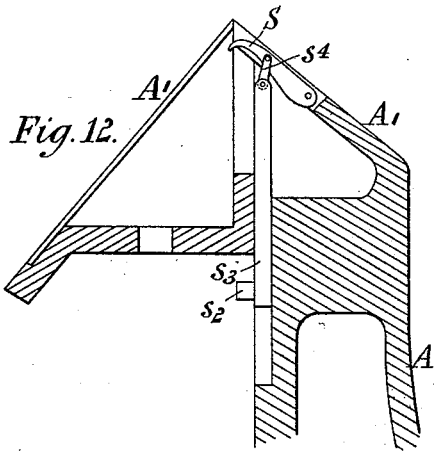
*Fig. 12.*
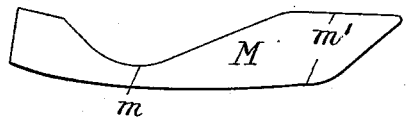
*Fig. 13.*

(No Model.) 10 Sheets—Sheet 9.
G. KLEIM & C. FORWERK.
MACHINE FOR STITCHING PAMPHLETS, &c.
No. 538,733. Patented May 7, 1895.

(No Model.)  10 Sheets—Sheet 10.

G. KLEIM & C. FORWERK.
MACHINE FOR STITCHING PAMPHLETS, &c.

No. 538,733. Patented May 7, 1895.

Witnesses:
J. M. Fowler Jr.
Aly. Stewart.

Inventors:
Gustav Kleim and
Carl Forwerk
By Church & Church
their Attorneys.

THE NORRIS PETERS CO., PHOTO-LITHO., WASHINGTON, D. C.

UNITED STATES PATENT OFFICE.

GUSTAV KLEIM AND CARL FORWERK, OF PLAGWITZ, GERMANY, ASSIGNORS TO ADOLPH RICKMANN, OF LONDON, ENGLAND.

MACHINE FOR STITCHING PAMPHLETS, &c.

SPECIFICATION forming part of Letters Patent No. 538,733, dated May 7, 1895.

Application filed July 20, 1892. Serial No. 440,585. (No model.) Patented in Germany October 2, 1890, No. 56,288, and in England June 10, 1892, No. 10,984.

*To all whom it may concern:*

Be it known that we, GUSTAV KLEIM and CARL FORWERK, subjects of the King of Saxony, residing at Plagwitz, in Saxony, German Empire, have invented certain new and useful Improvements in Machines for Stitching Pamphlets, Patterns, and the Like, of which the following is a specification, the same having been patented to us in Germany on the 2d of October, 1890, No. 56,288, and in England on June 10, 1892, No. 10,984.

This invention relates to a machine for stitching pamphlets, patterns, and the like, by means of threads.

By means of a machine constructed according to this invention, each book or pamphlet is provided with one or more tightly drawn knots, and the stitched pamphlets, or books all connected together by the threads, are subsequently severed from each other by hand or other suitable means.

Our invention consists of a machine constructed and arranged substantially in the manner hereinafter described and claimed.

Figure 14:
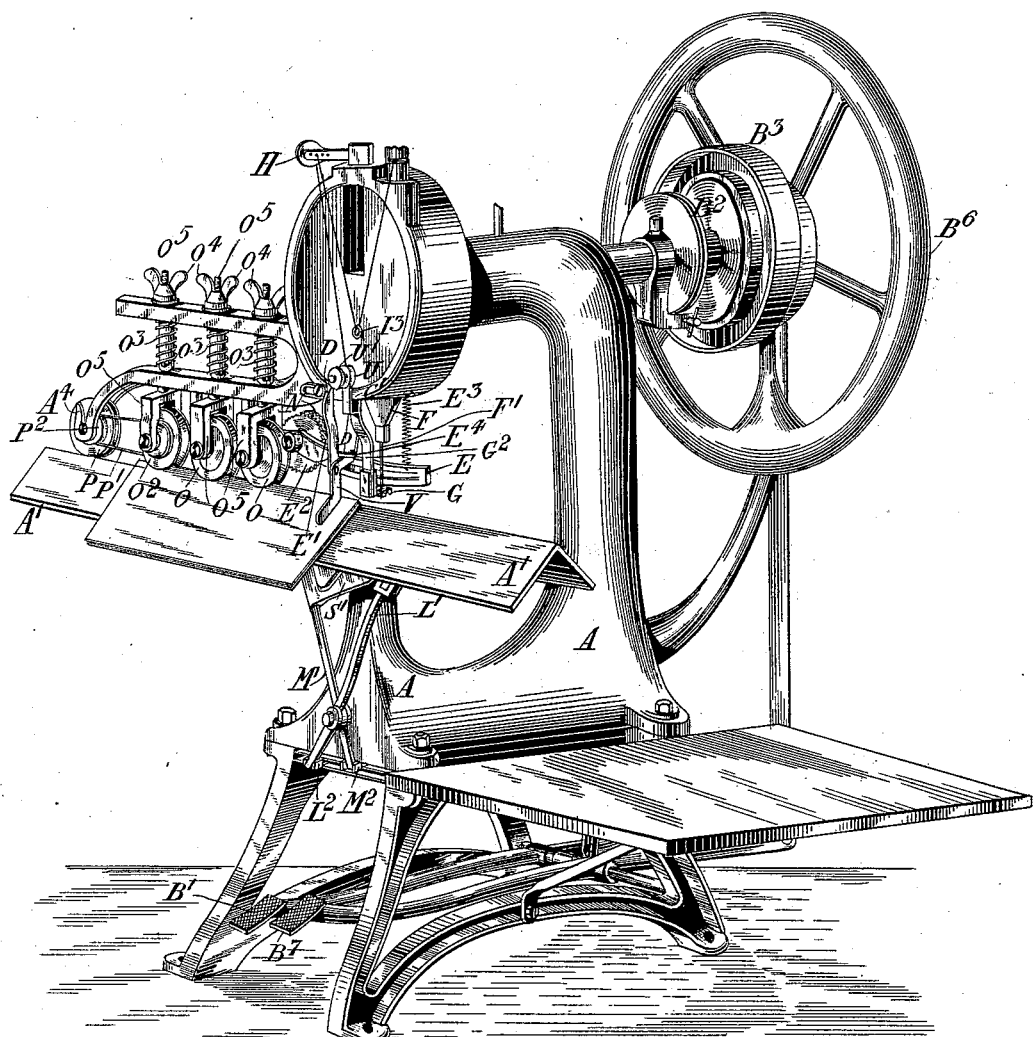
Figure 15:
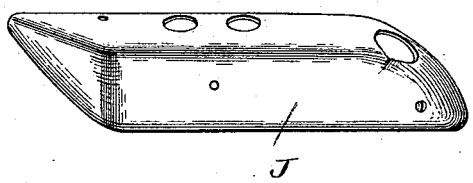
Figure 16:
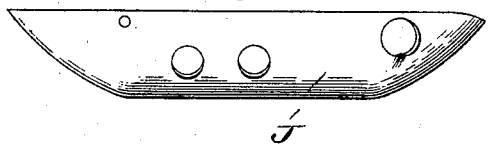
Figure 17:
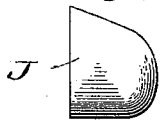

In the accompanying drawings, forming part hereof, Figure 1 is a front elevation of the machine, with the needle raised and partly in section, on the line 1 1 of Fig. 2, which is a vertical section on the line 2 2 of Fig. 1. Fig. 3 is a vertical section on the line 3 3 of Fig. 4, which is a front elevation, partly in section, on the line 4 4 of Fig. 3, showing the machine with the needle in its lowest position. In Figs. 1 to 4 only such parts of the machine are illustrated as are necessary to point out the features of the invention. Figs. 5 to 11 are detail views showing the various positions assumed by the needle, loop-catcher, shuttle, balancing-lever, and thread-hook as the knot is formed. Fig. 12 is a transverse section through the table, showing the thread-hook and the parts directly connected therewith. Fig. 13 is a plan of the loop-catcher; and Fig. 14 is a perspective view of the complete machine, some of the parts of which—for example, the fly-wheel—are shown in a slightly-modified form as compared with the corresponding parts shown in Figs. 1 to 4. Figs. 15, 16, and 17 are respectively front, top, and end elevations of the shuttle, showing the location of the points.

Like letters indicate like parts throughout the drawings and specification.

Referring now to the drawings in which in a suitable frame A, is supported a driving-shaft B, upon which are mounted the cams C, C', $C^2$ and $C^3$. The cam C, operates a bar D, which is slotted (Fig. 4) to work over the shaft B, and which at its lower end and as illustrated in Fig. 1, is adjustably connected to a pivoted pawl-carrying arm E, by which through suitable gearing and rollers hereinafter described, the feed or delivery of the work to be stitched is effected. The cam C', operates the needle-bar F and needle F', the bar F, being slotted as shown in Fig. 4, to work over the shaft B. The cam $C^2$, operates the presser-bar $G^2$, carrying presser-foot G; and the cam $C^3$, operates to the take-up H, acting on the needle-thread I, which is represented by dot-and-dash lines.

The driving shaft B, may be rotated, whenever by the pedal B', Fig. 14, the clutch $B^2$, is thrown into engagement, either from the speed pulley $B^3$, rotated by means of a driving belt, or through said pulley $B^3$, and gearing $B^4$, from the shaft $B^5$. The fly-wheel $B^6$, keyed on the shaft $B^5$, is suitably connected to the pedal $B^7$, so that it may be operated by the foot of the attendant.

To the frame A, the table A' is suitably attached.

According as it is desired to stitch ordinary folded sheets, patterns or entire pamphlets, the table may at the top assume an angular shape, as shown in the accompanying drawings. In the table A', is provided the way or race for the shuttle J, which, by means of a carrier L and lever L', is moved backward and forward therein. The shuttle used for performing the special operation for which it is intended, is peculiarly constructed. As may be seen in Figs. 15 to 17, when regarded from the front its points are situated on different levels, while if viewed from the top or bottom both points will be seen in the same straight line. This construction is necessary for the reason that to tie the knot according to this invention, the shuttle-thread Q, must be carried round and through the loop $i$, of the needle-thread I. M, is the loop-catcher which receives motion by means of levers M' and M², from a cam or eccentric M³. The shuttle-lever L', is operated from a cam or eccentric L³ through the medium of a lever L². The cams L³ and M³, are secured on the vertical shaft L⁴, geared with the shaft B, through miter-wheels L⁵.

The bar D, is pivotally connected to the arm E, by a bolt or equivalent device D', (Fig. 1) and by suitably adjusting the position of this bolt D' (for which purpose the arm E, is slotted, as shown in Fig. 1 and 4), a swinging movement of greater or less extent is obtained, and the work is consequently moved quicker or slower through the machine. The arm E, may for this purpose, if desired, also be suitably graduated to indicate the position to which the device D', must be adjusted in order to move the work through the machine at various speeds.

E³, is a spring connected to E for counteracting the weight of the arm E and bar D, so as to relieve the cam C. The pawl E', mounted on the pivoted arm E, at each upward stroke of said arm causes the ratchet-wheel E², to perform part of a revolution and at each downward stroke slips over the teeth of the ratchet-wheel. On the shaft of the ratchet-wheel E², is secured the toothed-wheel N, which through the wheels N' and N², operates the pressure rollers O and O', by the bearing of which, under the action of their springs O³, on the pamphlets the continuous conveyance of said pamphlets through the machine, is insured. The pressure exerted by the rollers O and O', on the pamphlets may be adjusted by screwing the winged nuts O⁴, more or less on or off the roller-carrying yokes or rods O⁵, on which the springs O³, act. The roller O', is formed integral with a pulley O², which through a band P,' and pulley P², rotates the roller P, working freely in open bearings A⁴, so that its weight may be imposed upon the pamphlets.

In operation, the book or pamphlet to be stitched or bound is placed upon the table A', in such a position that the part at which the first stitch is to be made, is just underneath the needle F'. Assuming that at that moment, as illustrated in Figs. 1 and 5, the needle is at the highest point of its stroke and the loop-catcher M, at the left, the shuttle J, is on the right of the needle-guide or path A³, and the shuttle-thread Q, which passes under the fixed stud $a'$, slightly depresses a balancing arm or lever R, over the whole length of which it passes while a pivoted thread-hook S, shown in the detail Figs. 5 to 11, and more particularly in Fig. 12, is retained at its highest position by a cam S', secured to the lever M', the upper part $s'$, of this cam being preferably in the form of a movable weighted arm pivoted at $s$. The balancing arm or lever R, overlies and is supported by the lever R' being guided in its ascent and descent by means of a pin $r$, working in curved slots $r'$, in two plates $r^2$, (one of which only is shown in the accompanying drawings) and between which work the arm R and the said lever R', hereinafter more particularly described.

The cam S', is connected to the thread-hook S, through the anti-friction roller $s^2$ and rod $s^3$, on which it is mounted, and link $s^4$, Fig. 12.

It will be noticed also viewing Fig. 5 that the shuttle thread is drawn substantially taut in front of and past the needle guiding slot.

Figure 8:
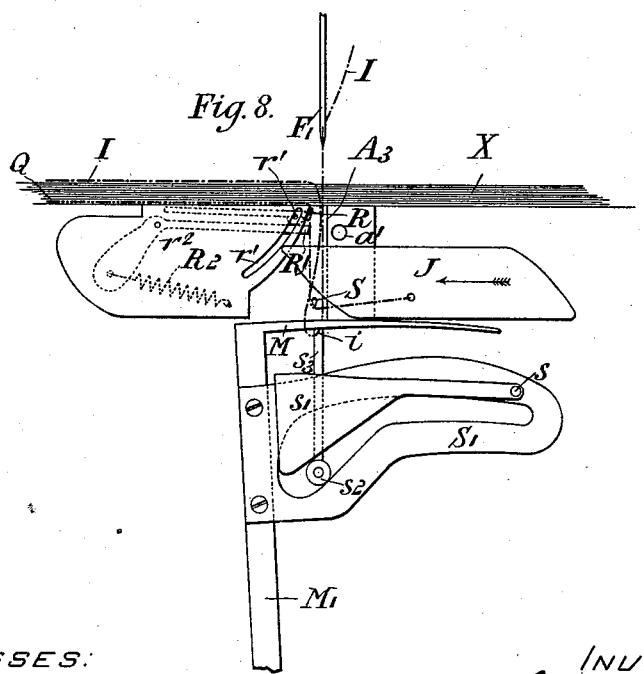

Such being the position of the parts if the machine be set in motion, the presser foot G, by means of its cam C², will first be moved down or caused to descend against the action of its spring G³, onto the material to be sewed, to secure it in position. The needle F', will then (while the needle-thread is securely held between the disks U, hereinafter described) pass through the folded sheet or pamphlet X, Figs. 5 to 11, and the loop-catcher M, will move forward (toward the right of Figs. 1 and 4 to 11), and catch the loop $i$, being formed by the needle-thread I, and afterward retain it while the needle accomplishes the first part of its upward movement. The relative positions assumed by the various parts of the stitch-forming mechanism at this stage are shown in Fig. 6. The shuttle J, then moves toward the left and in so doing loosens the thread Q, then outside of said shuttle so that the balancing arm or lever R, through the counterweighted or spring-controlled lever R', below it is raised to its highest position. The lever R', in the accompanying drawings is shown both counterweighted and provided with a spring R², but either a counterweight or spring may be used. At this juncture the thread-hook S, under the action of the cam S', moving toward the right with the loop catcher M, which cam draws the thread-hook down, draws down the thread Q, as shown in Fig. 7. Owing to the recessed, narrowed or deflected portion $m$, Fig. 13, of the loop-catcher or taker M, the needle thread I, which at this time is drawn somewhat tight by the ascent of the needle F', is moved or held aside (toward the front of the machine and toward the shuttle thread) on the narrowed part $m$, of the loop-taker M, sufficiently to admit of the forward shuttle point and thereafter, by the further deflection of the needle thread I, by the shuttle itself, of the shuttle passing behind it, as it is shown in Fig. 8. The shuttle thread Q, which would otherwise become loose as the shuttle proceeds toward the left, is tightened by being drawn downward by the thread hook S, this depression of the shuttle-thread being continued until the thread Q, is in such position that the forward point of the shuttle J, may pass over it as shown in Fig. 8, from which figure it is to be understood that the left-hand end or point of the shuttle is just passing over the then approximately horizontal portion of the shuttle thread Q, in front of the then vertical part thereof and between said vertical part and the needle thread both parts or sides of the loop of which, at this time, are at the front of the shuttle. The lowering of the thread hook S, at this part of the operation is effected by the weighted upper part $s'$, of the cam $S'$, acting through the medium of the before mentioned link $s^4$, on said thread-hook.

When the shuttle J, has completed its course toward the left, as shown in Fig. 9, it has passed completely over its own thread Q, and behind the needle thread loop and has thus formed a loop $q$, around the needle loop $i$, which is still held down by the loop catcher M. The balancing lever R, is at that moment in its lowest position because, by the passage of the shuttle J, to the left hand side of the needle-thread around which the shuttle-thread passes, the shuttle thread is in a state of tension and consequently draws the balancing-lever R, down. The shuttle J, now commences its return movement toward the right of Figs. 1 and 4 to 11, the tension on the shuttle-thread Q, being consequently released so that the balancing lever R, is free to be pressed upward by lever $R'$. When the balancing-lever R, is in this manner raised, it raises the shuttle thread Q, to the position shown in Fig. 10, the loop $q$, of which thread slips upward on the needle-thread loop $i$, which is still held down by the loop catcher M. The loop catcher M, has by this time receded somewhat toward the left and its widened portion $m'$, Fig. 13, has been brought into the loop $i$, of the needle thread I, which loop is thereby held open or widened sufficiently for the right hand point of the shuttle J, and thereafter the shuttle itself to pass through it as it is shown doing in Fig. 10. When the shuttle J, has completely passed through the needle-thread loop $i$, and completed or nearly completed its return stroke (toward the right) the loop-catcher M, by moving toward the left releases the needle thread loop $i$, and resumes its initial or furthermost left-hand position. During the latter part of the shuttle's return stroke (toward the right) the shuttle thread is again placed in a state of tension so that its loop $q$, is tightened on or about the needle thread loop $i$. The needle $F'$, at this time also approaches the limit of its upward movement and in doing so draws its loop $i$, tight on or about the shuttle thread loop $q$, so as to complete the knot as shown in Fig. 11.

The feeding or delivering device is adjusted at will either by varying the position of the bolt $D'$, in the arm E, as before described or by substituting for the ratchet wheel $F^2$, another ratchet wheel of larger or smaller diameter and correspondingly shifting the pawl $E'$, so that the length of the stitches or the distance between the knots may be increased or decreased as desired. As soon as the last stitch has been made in one book, a fresh book or folded sheet is fed up to the place of its predecessor under the needle $F'$, and both books are then, for the time being connected by the threads I and Q, and are subsequently cut asunder by hand or other suitable means.

It is preferred to pass the "top" or needle thread between two washers or disks U, one or both spring-controlled so that the thread will be gripped between them to the desired extent which may be adjustable by a nut $U'$. An arm $G'$, carried on the presser-foot bar $G^2$, forces the disks U, apart and releases the thread I, when, by the raising of the bar $G^2$, the end of the arm $G'$, is inserted between the disks U. This raising of bar $G^2$, is effected by its cam $C^2$, and takes place immediately after the withdrawal by means of the cam $C'$, and needle bar F, of the needle $F'$, from pamphlet X. At this stage of the operation the bar D, is drawn upward by its cam C, so that through the rollers O, $O'$, and P and their operative mechanism the pamphlet X, is moved through the machine to the position necessary for receiving the next stitch; this movement forward of pamphlet X, being rendered possible by the previous release of the needle-thread I, by the separation of the disks U, and also facilitated by the previous operation of the take-up H, and consequent slackening of the needle thread between the needle and source of thread-supply. When pamphlet X, has arrived at this last-named position, the rollers O, $O'$, P and consequently pamphlet X, become once again stationary or inoperative owing to the pawl $E'$, slipping over the teeth of $E^2$, during the descent of bar D. During this pause in the movement of pamphlet X, the next knot is formed, the presser foot G, being the first to reach the pamphlet, owing to the descent of bar $G^2$, at which operation $G'$, is withdrawn from between disks U, and the thread I, is thereby gripped again between disks U. Next, the needle $F'$, descends through pamphlet X, and the knot is formed as before described after which the needle reascends, the presser-foot G, being pressed on pamphlet X, until the needle is clear of it.

A pivoted gage V, which may also act as an auxiliary presser-foot may be applied so that as each pamphlet is inserted in the machine by hand it may be moved up to it and in consequence will receive the first stitch in the same position as its predecessor did. This gage V, may be of approximately bell-crank-lever form, but with an angularly projecting arm adapted, when the gage is in its lowered or operative position, to rest on the front inclined face of the table $A'$, as shown in full lines in Fig. 2. The gage V, may be raised as indicated in dot-and-dash lines in Fig. 2 by an arm $E^4$, Figs. 1, 2 and 4, rigidly mounted on the ratchet-carrying arm E, and which arm $E^4$ extends across the rearwardly extending arm of the gage and is depressed at each downward stroke of arm E. The gage V, is lowered by a spring $v$, acting on its rearwardly extending arm at each ascent of the arm $E^4$. The gage is raised clear of the pamphlets at the time when they are to be moved by the rollers O, O' and P, onward through the machine and it is lowered when the rollers are stationary so that a new unstitched pamphlet may, by being placed against it, be inserted in its proper position within the machine.

The under or shuttle thread is held on any preferred form of cop or pirn in the shuttle and the usual or any preferred tension devices are provided on the shuttle for preserving the tension of the lower thread.

The shuttle carrier L, is provided with a prong $l$ for preventing the threads from passing to the outside of the carrier L, when the shuttle J, is being passed about or through the loop $i$.

It will be obvious that modifications may be made as to details without departing from the spirit of our invention and hence we do not wish to be understood as limiting ourselves to the precise construction and arrangement hereinbefore explained.

Having thus described the nature and objects of our invention, what we claim as new, and desire to secure by Letters Patent, is—

1. In a machine, such as described, having a race way in which the shuttle reciprocates, a shuttle having the substantially straight body, with two points extending in planes parallel with the longitudinal axis of the body in opposite directions and both located in substantially the same vertical plane, but in different horizontal planes; substantially as described.

2. In a machine such as described, the combination with a shuttle having a point at each end and in different horizontal planes, of a loop-catcher having a narrowed or deflected part for deflecting the needle thread loop in a lateral direction, substantially as specified.

3. In a machine such as described, the combination with the shuttle pointed at each end, of a pointed loop catcher having an intermediate lateral deflecting incline or part, for deflecting the needle thread loop in a lateral direction; substantially as described.

4. In a machine, such as described, the combination with the stitch forming mechanism, of a feed mechanism comprising a positively driven roller having a pulley attached to rotate therewith, a gravitating roller having a pulley and mounted in open bearings in proximity to the driven roller and a band passing around the pulleys for rotating said gravitating roller; substantially as described.

5. In a pamphlet sewing machine, the combination with the stitch forming mechanism, work holding mechanism with means for elevating the same and feeding mechanism, of an independent auxiliary presser foot located in advance of the ordinary presser foot and cooperating connections between the auxiliary presser foot and the feeding mechanism for raising the former as the feeding mechanism becomes operative whereby it is adapted to form a gage against which the pamphlets may be positioned; and the gage elevated for the pamphlets to advance; substantially as described.

6. In a pamphlet sewing machine, the combination with the stitch forming mechanism, work holding mechanism with means for elevating the same and intermittingly operated feeding mechanism, of an independent pivoted auxiliary spring pressed presser foot located between said feeding mechanism and ordinary presser foot and cooperating connections between the auxiliary presser foot and feeding mechanism for raising the former as the feed advances the pamphlets whereby it forms a gage for positioning the articles to be stitched; substantially as described.

7. In a machine such as described, the combination with the needle, shuttle and loop catcher with means for operating the same, of the thread hook, a movable cam and connections between said cam and hook; substantially as described.

8. In a machine such as described, the combination with the needle and shuttle with means for operating the same, of the thread hook with means for elevating it and the pivoted weighted cam arm for depressing the same; substantially as described.

9. In a machine such as described, the combination with the needle and shuttle with means for operating the same, of the pivoted thread hook and its operating cam having the pivoted weighted cam arm for depressing the hook; substantially as described.

10. In a machine such as described, the combination with the work table, thread carrying needle, thread carrying shuttle and operating mechanism for forming a stitch, of the thread hook S and the yielding pivoted lever R cooperating with the shuttle thread only to position the same; substantially as described.

11. In a machine, such as described, the combination with the work table, thread carrying needle, thread carrying shuttle and operating mechanism for forming a stitch, of the thread hook S and the pivoted and counterbalanced lever R cooperating with, and free to yield to strain on the shuttle thread, said lever being adapted to position the shuttle thread, as described.

12. In a machine such as described, the combination with the work table, needle and shuttle with means for operating the same, of a pivoted balancing lever co-operating with the shuttle thread and the thread hook also cooperating with said thread whereby the same is positioned; substantially as described.

In testimony whereof we have hereto set our hands in the presence of the two subscribing witnesses.

GUSTAV KLEIM.
CARL FORWERK.

Witnesses:
CARL BORNGRAEBER,
CURT STÖCKERT.